Patented Feb. 25, 1936

2,031,634

UNITED STATES PATENT OFFICE 2,031,634

WATER SOLUBLE DIAZOIMINO COMPOUNDS

Miles Augustinus Dahlen, Wilmington, Del., assignor to E. I. du Pont de Nemours & Company, Wilmington, Del., a corporation of Delaware No Drawing. Application October 3, 1934, Serial No. 746,649

12 Claims. (Cl. 260—38.5)

A. This invention relates to new compositions of matter which have particular utility in the field of azo dyes. More particularly the invention relates to agents capable of stabilizing diazotized primary arylamines against reaction with typical coupling components in a basic medium, and to the stabilized compositions of matter which result from coupling these agents to a said diazotized amine. The invention will be described with particular reference to the use of the new compounds in stabilizing the azo components of dyestuffs, and in its relation to the methods of stabilizing such components, but it is to be understood that this description is intended to be exemplary, not limitative.

B. The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized in a manner which will be understood by persons skilled in the art, and is reacted with the second component, often in solution. Generally speaking, the aryl nuclei of the azo dyes contain certain substituents which change, but do not originate, the color of the dyestuffs and are called "auxochromes". The auxochromes form a recognized class, divided into two groups, of which the one tends to make the dyestuff water-soluble, and the other does not. In this invention those auxochrome groups which tend to make the dyestuff water-soluble are called s-auxochromes and those which do not are called n-auxochromes.

C. The prior art discloses within the field of azo dyestuffs a class which are called "developed" or "ingrain" azo dyes. Dyeing with developed dyes is accomplished by affixing to the material to be dyed either the azo or the coupling component, thereafter immersing the material in a solution containing the other component, whereby the reaction completing the dye takes place on the material. A particular method of applying such dyes is to stabilize one component against reaction with the other, to pad the material with a mixture containing them, and to complete the dye and the dyeing simultaneously by causing the components to couple. In one method of application the azo component, a diazotized arylamine, is coupled to a stabilizing agent, such as piperidine-alpha-carboxylic-acid, and is incorporated in a paste with the coupling component and enough of a base to prevent the stabilized diazo compound from breaking up and coupling with the coupling component. The paste is applied to the material-to-be-dyed, e. g. a fabric, and the dye is produced by subjecting the impregnated fabric to the action of a weak acid. This process is much used in the dyeing of goods by printing.

D. It is an object of the invention to prepare new agents capable of stabilizing a diazotized arylamine against reaction in neutral or alkaline solution with coupling components. Another object of the invention is to produce azo components stabilized, in neutral or basic solution, against reaction with coupling components capable of forming, with the azo component, an azo dyestuff. Another object of the invention is a method of stabilizing azo components against reaction in neutral or basic solution with a coupling component. Another object of the invention is to produce new compositions of matter. Other objects of the invention will be in part apparent and in part hereinafter more fully set forth.

E. The objects of the invention are accomplished, generally speaking, by coupling a primary arylamine which may contain in the aryl nucleus one or several n-auxochrome substituents, but which does not contain an s-auxochrome, through the diazo group to the nitrogen of ac-tetrahydro-quinoline-sulfonic acid in neutral or alkaline medium. Other objects of the invention are attained in greater or less degree by the means, method, and products hereinafter more fully set forth or coming within the scope of this invention.

F. In practicing the invention in the preferred form there is selected a primary arylamine containing one or more n-auxochromes substituted for hydrogen of the aryl nucleus. The n-auxochromes are, specifically, the organic radicals alkyl, alkoxy, aryloxy, aralkyl, aralkoxy, aryl, hydro-aryloxy, trifluoro-methyl, halogen and nitro. Results of a kind sufficient to include them within the scope of the invention may be secured by the use of an arylamine not having an n-auxochrome substituent, but they are not preferred. Arylamines containing s-auxochromes are unsatisfactory, if the reaction products are to be used for the production of water-insoluble azo dyes. The s-auxochromes are the carboxylic and sulfonic acid groups. The selected arylamine is stabilized by diazotizing it and coupling it, preferably in aqueous medium, with an ac-tetrahydro-quinoline-sulfonic acid, within which term it is intended to include the substituted ac-tetrahydro-quinoline-sulfonic acids, particularly those which are called ac-tetrahydro-quinaldine-sulfonic acids. In the presence of a base the resulting compound may be mixed in aqueous medium with a typical azo coupling component without forming the dyestuff. The dyestuff may be formed by treating the mixture with warm dilute acid which will free the diazotized arylamine from the stabilizing agent and permit it to couple to the coupling component.

G. Exemplary of the very large number of primary arylamines which may be stabilized by this invention are the following: 4-nitro-2-amino-anisole; 2,5-dichlor-aniline; 4-chloro-2-amino-toluene; 2-methoxy-1-naphthylamine; 2-methoxy-aniline; 2-phenoxy-aniline; 2-ethoxy-aniline; 2-chlor-5-methyl-aniline; 2-methyl-aniline; 2-methoxy-5-methyl-aniline; 2-methoxy-4-chlor-5-methyl-aniline; 2,5-dimethoxy-aniline; 2,5-diethoxy-aniline; 2,5-dimethoxy-4-chlor-aniline; 5-brom-2-methoxy-aniline; 3-iodo-6-methoxy-aniline; 3-iodo-6-ethoxy-aniline; 3-methyl-4-chlor-aniline; 3-brom-6-ethoxy-aniline; 3-chlor-6-ethoxy-aniline; 3-ethoxy-aniline; 3-phenoxy-aniline; 3-methoxy-aniline; 3-brom-6-phenoxy-aniline; 3-iodo-6-phenoxy-aniline; 3-brom-6-methyl-aniline; 3-chlor-6-methyl-aniline; 3-methyl-aniline; 3-brom-5-methyl-aniline; 3-chlor-6-phenoxy-aniline; 2,5-dimethyl-4-chlor-aniline; 4-ethyl-aniline; 4-amino-benzotrifluoride; 4-chlor-2-methoxy-aniline; 4-brom-2-methoxy-aniline; 4-brom-2-ethoxy-aniline; 4-iodo-2-methoxy-aniline; 4-methoxy-aniline; 4-chlor-2-ethoxy-aniline; 4-phenoxy-aniline; 4-ethoxy-aniline; 4-brom-2-phenoxy-aniline; 4-methoxy-2-chlor-aniline; 4-chlor-2-methyl-aniline; 4-methyl-3-brom-aniline; 4-brom-3-methyl-aniline; 4-methyl-3-chlor-aniline; 4-methyl-aniline; 4-chlor-2-phenoxy-aniline; 4-methoxy-3-chlor-aniline; 4-phenoxy-2-chlor-aniline; 4-chlor-2,5-diethoxy-aniline; 3-chlor-2-methyl-aniline; 3-chlor-2-methoxy-aniline; alpha-naphthylamine; beta naphthylamine; ortho-chlor-aniline; meta-chlor-aniline; meta-nitraniline; 4-chloro-2-nitraniline; 4-chloro-2-amino-anisole; 5-nitro-2-amino-anisole; 1-amino-4-benzoylamino-2,5-diethoxy-benzene; N - para - amino-benzoyl) -aniline; dianisidine; alpha-amino-anthraquinone; 3-amino-carbazole; 2-nitro-4-methyl-benzene-azo-cresidine; 4,4'-diamino-diphenylamine.

H. The following examples serve to disclose one method of making the new products by the new processes. The examples are, however, illustrative and not limitative of the invention. All quantities are stated in parts by weight.

EXAMPLE I

Preparation of ac-tetrahydro-quinoline-sulfonic acid 13.3 parts of ac-tetrahydro-quinoline are slowly added to 50.0 parts of sulfuric acid monohydrate with vigorous stirring and external cooling. The mixture is then heated to 90–5° C. for 15–16 hours. After cooling, the sulfonation mass is poured on ice, when white crystals of the tetrahydro-quinoline-monosulfonic acid slowly separate. These are filtered off and washed with a little ice water. Purification may be effected by dissolving in a little dilute sodium hydroxide solution, clarifying, and reprecipitating with hydrochloric acid. Any other satisfactory means of preparing the sulfonic acid compounds may be employed.

EXAMPLE II

Ac-tetrahydro-quinaldine-sulfonic acid may be obtained by the sulfonation of 14.7 parts of ac-tetrahydro-quinaldine by the procedure of Example I.

EXAMPLE III

Preparation of ac-tetrahydro-quinoline disulfonic acid 13.3 parts of ac-tetrahydro-quinoline are sulfonated as in Example I. On adding an excess of sulfur trioxide (as 65% oleum) and continued heating a disulfonic acid is obtained. The sodium salt is obtained by adding an equivalent amount of sodium carbonate and an excess of calcium carbonate, filtering the hot solution and evaporating the filtrate to dryness.

EXAMPLE IV

Preparation of ac-tetrahydro-quinaldine disulfonic acid 14.7 parts of ac-tetrahydro-quinaldine are disulfonated under the same conditions as stated in Example III.

I. The method of stabilizing the diazotized arylamines, and of producing the stabilized diazotized arylamines, is illustrated by the following examples.

EXAMPLE V

Diazoimino derivative of 4-chloro-2-amino-anisole and ac-tetrahydro-quinoline-mono-sulfonic acid 15.75 parts of 4-chloro-2-amino-anisole are warmed with 60 parts of water containing 30 parts of hydrochloric acid of 20° Bé. The solution is cooled, 60 parts of ice added, and then 7 parts of sodium nitrite in 30 parts of water are slowly added. When the diazotization is complete, the solution is filtered.

21.3 parts of ac-tetrahydro-quinoline sulfonic acid are dissolved in 200–300 parts of water containing just enough sodium hydroxide to convert the acid to the soluble sodium salt. 15 parts of sodium carbonate are added followed by the solution of diazotized 4-chloro-2-amino-anisole, the temperature being maintained at about 10° C. by external cooling. More sodium carbonate may be added, if necessary, to maintain an alkaline reaction to Brilliant yellow papers. When the addition of the diazo-solution is complete, tests for free diazo-salt by "spotting" with a coupling agent give negative results, indicating that the following reaction has taken place:

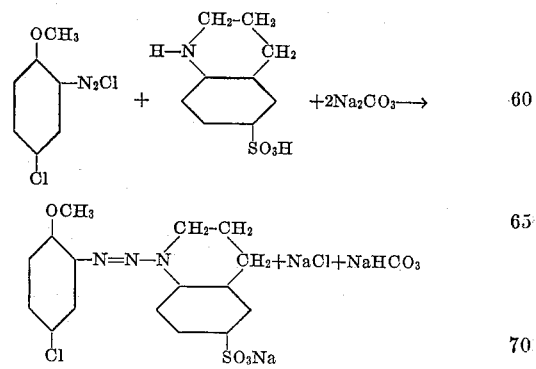

This diazoimino compound may be completely salted out of solution, separated and dried, preferably in vacuo at 70–80° C.

The new diazoimino-compound is a stable, light-colored solid of fair solubility in water. It is very stable toward the action of cold alkalies; it is not readily hydrolyzed by cold dilute solutions of weak acids, but when heated with dilute acids it is hydrolyzed to the diazo-salt and ac-tetrahydro-quinoline-sulfonic acid.

Equivalent amounts of other arylamines of the class above illustrated may be substituted for 4-chloro-2-amino-anisole in the above procedure.

EXAMPLE VI

*Diazoimino derivative of 4-chloro-2-amino-anisole and ac-tetrahydro-quinaldine sulfonic acid*

This product was obtained by a condensation with diazotized 4-chloro-2-amino-anisole under the same conditions as given above in Example V. The reaction may be represented by the following equation:

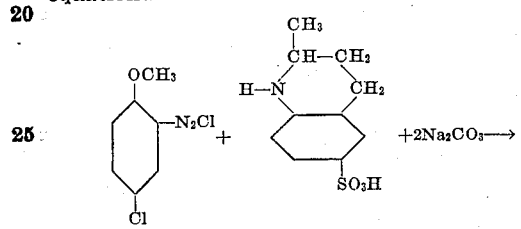

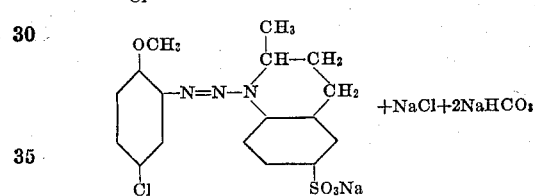

The properties of the coupling product are very similar to those of the product obtained in Example V.

The other aromatic amines may be substituted for 4-chlor-2-amino-anisole in preparing a suitable diazo-solution.

EXAMPLE VII

*Diazoimino derivative of 4-chloro-2-amino-anisole and ac-tetrahydro-quinoline disulfonic acid*

The product was obtained by a condensation with diazotized 4-chloro-2-amino-anisole under the same conditions as given above in Example V. The reaction may be represented by the following equation:

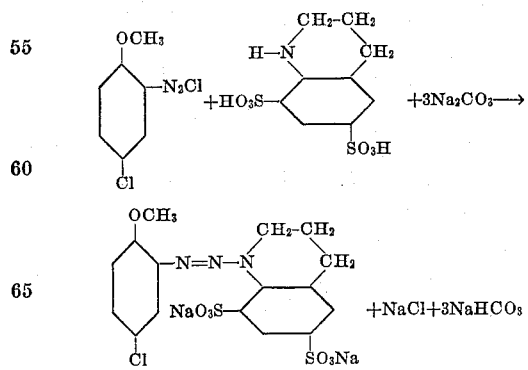

EXAMPLE VIII

*Diazoimino derivative of 4-chloro-2-amino-anisole and ac-tetrahydro-quinaldine-disulfonic acid*

This product also was obtained by a condensation with diazotized 4-chloro-2-amino-anisole under the conditions given in Example I. The reaction may be represented by the following equation:

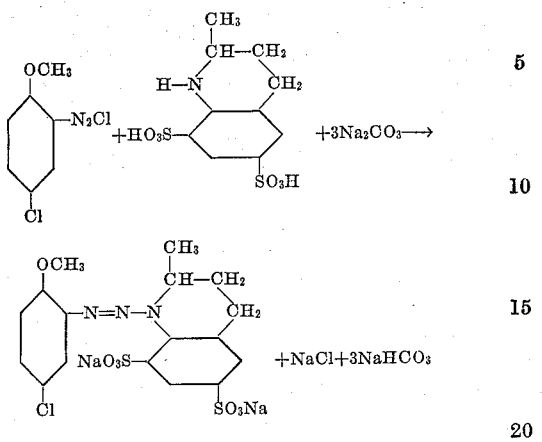

This diazoimino compound is similar in properties to the compound obtained in Example VII.

J. It will also be understood that the processes for the preparation of the new products are susceptible of wide variations. The conditions for the diazotization of aromatic amines are subject to considerable variation, as is well known, and the coupling of the diazo-salts with the tetrahydroquinoline and tetrahydroquinaldine derivatives may be carried out in various ways. For example, various alkalies or "buffers" have been found suitable for neutralization of the diazo-salt and for effecting the coupling reaction. Under proper conditions, it is possible to use sodium hydroxide, sodium carbonate, sodium bicarbonate, sodium acetate, and so forth, for this purpose. Further, the isolation of the products may be effected by various procedures. Usually the products may be precipitated by the addition of "salting agents", such as sodium chloride and sodium sulfate. Sometimes the products may be so soluble that evaporation to dryness is the best method of securing them in a dry form. The product thus obtained may be freed from the by-product inorganic salts by extraction with ethyl alcohol or some suitable solvent in which these inorganic salts are insoluble. The filtered alcoholic solution is again evaporated to dryness to recover the product.

K. Among the advantages of the invention are that the new diazoimino compounds may be mixed in basic or neutral medium with substantially equal quantities of the usual azo coupling components, such as the arylamides of 2,3-hydroxy-naphthoic acid or of other hydroxy-arylcarboxylic acids, acyl-acetyl-arylamines and arylene-diamines, naphthols, and aryl-methyl-pyrazolones, and the products may be used for the production of azo dyestuffs by a one-bath process. Textile fibers may be printed with pastes containing the above mixtures, alkali, and the usual thickeners, and then heated in the presence of mild acids, which results in printing the fabrics in bright shades of excellent fastness.

L. As many apparently widely different embodiments of this invention may be made without departing from the spirit and scope thereof, it is to be understood that I do not limit myself to the specific embodiments thereof except as defined in the appended claims.

I claim:

1. A composition of matter being a product of coupling diazotized 4-chloro-2-amino-anisole through the azo group to nitrogen of ac-tetrahydro-quinoline-beta-mono-sulfonic acid.

2. A composition of matter being the product of coupling diazotized 4-chloro-2-amino-anisole through the azo group to nitrogen of ac-tetrahydro-quinaldine-mono-sulfonic acid.

3. A composition of matter being the product of coupling diazotized 4-chloro-2-amino-anisole with ac-tetrahydro-quinaldine-disulfonic acid.

4. A composition of matter being the product of coupling diazotized 4-chloro-2-amino-anisole through the azo group to nitrogen of ac-tetrahydro-quinoline-sulfonic acid having less than three sulfonic groups.

5. A composition of matter being the product of coupling a diazotized primary arylamine, having no water-solubilizing substituents, through the azo group to nitrogen of an ac-tetrahydro-quinoline-sulfonic acid having less than three sulfonic groups.

6. The method of stabilizing a diazotized primary arylamine against reaction in alkaline admixture with an azo dye coupling component which comprises coupling diazotized 4-chloro-2-amino-anisole through the azo group to nitrogen of ac-tetrahydro-quinoline-beta-mono-sulfonic acid.

7. The method of stabilizing a diazotized primary arylamine against reaction in alkaline admixture with an azo dye coupling component which comprises coupling diazotized 4-chloro-2-amino-anisole through the azo group to nitrogen of ac-tetrahydro-quinaldine-mono-sulfonic acid.

8. The method of stabilizing a diazotized primary arylamine against reaction in alkaline admixture with an azo dye coupling component which comprises coupling diazotized 4-chloro-2-amino-anisole with ac-tetrahydro-quinaldine-disulfonic acid.

9. The method of stabilizing a diazotized primary arylamine against reaction in alkaline admixture with an azo dye coupling component which comprises coupling diazotized-4-chloro-2-amino-anisole through the azo group to nitrogen of ac-tetrahydro-quinoline-sulfonic acid having less than three sulfonic groups.

10. The method of stabilizing a diazotized primary arylamine against reaction in alkaline admixture with an azo dye coupling component which comprises coupling a diazotized primary arylamine, having no water-solubilizing substituents, through the azo group to nitrogen of an ac-tetrahydro-quinoline-sulfonic acid having less than three sulfonic groups.

11. A composition of matter being the product formed by coupling nitrogen of a diazotized primary arylamine to nitrogen of one of a group of compounds consisting of ac-tetrahydro-quinoline-sulfonic acid and ac-tetrahydro-quinaldine-sulfonic acid.

12. The method of stabilizing a diazotized primary arylamine against reaction in alkaline admixture with an azo dyestuff coupling component which comprises coupling a diazotized primary arylamine having no water-solubilizing substituents through the azo group to nitrogen of one of a group of compounds consisting of ac-tetrahydro-quinoline-sulfonic acid and ac-tetrahydro-quinaldine-sulfonic acid.

MILES AUGUSTINUS DAHLEN.